US008189581B2

(12) United States Patent
Bachu et al.

(10) Patent No.: US 8,189,581 B2
(45) Date of Patent: *May 29, 2012

(54) METHOD, SIGNAL AND APPARATUS FOR MANAGING THE TRANSMISSION AND RECEIPT OF BROADCAST CHANNEL INFORMATION

(75) Inventors: Raja S. Bachu, Des Plaines, IL (US); Michael E. Buckley, Grayslake, IL (US); Kenneth A. Stewart, Grayslake, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 807 days.

This patent is subject to a terminal disclaimer.

(21) Appl. No.: 11/765,876

(22) Filed: Jun. 20, 2007

(65) Prior Publication Data

US 2008/0320527 A1 Dec. 25, 2008

(51) Int. Cl.
*H04L 12/28* (2006.01)
*H04L 27/06* (2006.01)
*H04J 3/00* (2006.01)
*H04N 7/16* (2006.01)

(52) U.S. Cl. ........... 370/390; 370/345; 375/341; 725/62

(58) Field of Classification Search .................... 752/62, 752/110; 714/774; 370/521; 725/62, 110

See application file for complete search history.

(56) References Cited

U.S. PATENT DOCUMENTS

| | | | |
|---|---|---|---|
| 5,319,712 A | 6/1994 | Finklestein et al. | |
| 6,067,444 A | 5/2000 | Cannon et al. | |
| 6,097,772 A | 8/2000 | Johnson et al. | |
| 6,360,345 B1 | 3/2002 | Kim et al. | |
| 6,392,572 B1 | 5/2002 | Shiu et al. | |
| 6,782,035 B1 | 8/2004 | Nakamura et al. | |
| 6,788,959 B2 | 9/2004 | Jokinen et al. | |
| 7,058,407 B2 | 6/2006 | Chi et al. | |
| 7,243,285 B2 | 7/2007 | Foisy et al. | |
| 7,260,764 B2* | 8/2007 | Chen | 714/774 |
| 7,321,643 B2 | 1/2008 | Chang et al. | |
| 7,453,907 B2 | 11/2008 | Jonsson et al. | |
| 7,593,489 B2 | 9/2009 | Koshy et al. | |
| 7,600,172 B2 | 10/2009 | Berens et al. | |
| 7,711,068 B2 | 5/2010 | Shokrollahi et al. | |

(Continued)

FOREIGN PATENT DOCUMENTS

EP 1811674 A1 7/2007

(Continued)

OTHER PUBLICATIONS

3GPP TSG-GERAN Meeting #25, GP-015429 Jun. 20-24, 2005.

(Continued)

*Primary Examiner* — Lester Kincaid
*Assistant Examiner* — Kuo Woo (57) ABSTRACT

The present invention provides a method for transmitting broadcast channel information as part of a broadcast channel signal having one or more transmission intervals, where each transmission interval includes a plurality of transmissions, and one or more of the transmissions are active frames in which broadcast channel information is transmitted. Invariant portions that are present in the broadcast channel information are identified separate from any variant portions and are encoded for transmission, and the variant portions are used to select transmission specific configurations, which can be detected during the decoding by the receiver. Upon detection of the transmission specific configuration used to encode the invariant portions, the value of the variant portion can be identified and reintroduced as part of the received broadcast channel information.

20 Claims, 5 Drawing Sheets

U.S. PATENT DOCUMENTS

| | | | |
|---|---|---|---|
| 7,813,453 | B2 | 10/2010 | Khandekar et al. |
| 2001/0014858 | A1 | 8/2001 | Hirayama |
| 2002/0056064 | A1 | 5/2002 | Kidorf et al. |
| 2002/0159545 | A1 | 10/2002 | Ramesh et al. |
| 2002/0172261 | A1 | 11/2002 | Hershey et al. |
| 2002/0186778 | A1 | 12/2002 | Agami et al. |
| 2003/0039217 | A1 | 2/2003 | Seo et al. |
| 2003/0072286 | A1 | 4/2003 | Kim et al. |
| 2003/0112780 | A1 | 6/2003 | Ouyang et al. |
| 2003/0118031 | A1 | 6/2003 | Classon et al. |
| 2004/0179469 | A1 | 9/2004 | Attar et al. |
| 2004/0225940 | A1 | 11/2004 | Kerr et al. |
| 2005/0003831 | A1 | 1/2005 | Anderson |
| 2005/0030914 | A1 | 2/2005 | Binzel et al. |
| 2005/0030964 | A1 | 2/2005 | Tiedemann, Jr. et al. |
| 2005/0276249 | A1 | 12/2005 | Damnjanovic et al. |
| 2005/0276266 | A1 | 12/2005 | Terry |
| 2006/0040706 | A1 | 2/2006 | Wu et al. |
| 2006/0193348 | A1 | 8/2006 | Unno et al. |
| 2006/0256792 | A1 | 11/2006 | Kwong et al. |
| 2007/0042794 | A1 | 2/2007 | Fischer |
| 2008/0039133 | A1 | 2/2008 | Ma et al. |
| 2008/0072269 | A1* | 3/2008 | Malladi et al. ............... 725/110 |
| 2008/0181163 | A1 | 7/2008 | Ye et al. |
| 2008/0186885 | A1 | 8/2008 | Athalye et al. |
| 2008/0294962 | A1 | 11/2008 | Goel |
| 2008/0316995 | A1 | 12/2008 | Bachu et al. |
| 2008/0320527 | A1 | 12/2008 | Bachu et al. |
| 2009/0149207 | A1 | 6/2009 | Zhang et al. |
| 2009/0168927 | A1* | 7/2009 | Bachu et al. ............... 375/341 |

FOREIGN PATENT DOCUMENTS

| | | | |
|---|---|---|---|
| EP | 1811711 | A1 | 7/2007 |
| GB | 2418571 | A | 3/2006 |
| JP | 2006014365 | | 1/2006 |
| WO | 9825360 | A | 6/1998 |
| WO | 9927745 | A | 6/1999 |
| WO | 0062467 | A | 10/2000 |
| WO | 2007087511 | A2 | 8/2007 |
| WO | 2007087512 | A2 | 8/2007 |
| WO | 2008000292 | A1 | 1/2008 |

OTHER PUBLICATIONS

3GPP TS 44.0.05 V7.0.0; Nov. 2005; 32 pages.
3GPP TS 44.0.06 V6.2.0; Nov. 2005; 59 pages.
IEEE Transactions on Information Theory, vol. IT-13, No. 2, Apr. 1967.
Public Email Discussion Forum: 3GPP_TSG_RAN_WG1@LIST.ETSI.ORG, Discussion Group; Chmiel, M. Jun. 11, 2007 8:49 AM.
Public Email Discussion Forum: 3GPP_TSG_RAN_WG1@LIST.ETSI.ORG, Discussion Group; Buckley, M. Jun. 11, 2007 8:47 PM.
Public Email Discussion Forum: 3GPP_TSG_RAN_WG1@LIST.ETSI.ORG, Discussion Group; Shiego, T. Jun. 12, 2007 10:19 PM.
Public Email Discussion Forum: 3GPP_TSG_RAN_WG1@LIST.ETSI.ORG, Discussion Group; Jianglei, M. Jun. 13, 2007 8:35 AM.
Public Email Discussion Forum: 3GPP_TSG_RAN_WG1@LIST.ETSI.ORG, Discussion Group; Dahlman, E. Jun. 13, 2007 9:27 AM.
Public Email Discussion Forum: 3GPP_TSG_RAN_WG1@LIST.ETSI.ORG, Discussion Group; Jianglei, M. Jun. 14, 2007 3:53 PM.
Public Email Discussion Forum: 3GPP_TSG_RAN_WG1@LIST.ETSI.ORG, Discussion Group; Onggosanusi, E Jun. 15, 2007 12:39 AM.
Public Email Discussion Forum: 3GPP_TSG_RAN_WG1@LIST.ETSI.ORG, Discussion Group; Chmiel, M. Jun. 15, 2007 2:12 AM.
Public Email Discussion Forum: 3GPP_TSG_RAN_WG1@LIST.ETSI.ORG, Discussion Group; Joonyoung, C. Jun. 18, 2007 7:07 AM.
3GPP TS 25.212 V6.7.0, Dec. 2005; 84 pages.
3GPP TSG RAN WG1 #49 Meeting, Kobe, Japan, May 7-11, 2007 R1-072265.
R2-061459 System Broadcast 3GPP TSG-RAN WG2 Meeting #53 May 3, 2006.
Sanderovich et al., LDPC Coded MIMO Multiple Access With Iterative Joint Decoding, IEEE Transactions on Information Theory, vol. 51, No. 4, Apr. 2005, pp. 1437-1450.
A. Viterbi, "Error Bounds for Convolutional Codes and an Asympototically Optimum Decoding Algorithm", iEEE Transactions Information Theory, Apr. 1967, vol. IT-13, No. 2.
Annamalai A. et al: Analysis of Unslotted Direct-Sequence Spread Spectrum Multiple Access network with Packet combining XP006007997, Sep. 25, 1997, pp. 1673-1674.
Miyagi M. et al.: "Selective Repeat Type-II Hybrid Fec/ARG Systems Using concatenated Codes", XP000425130, Electronics and communication in Japan, Part I, vol. 76, No. 6, Jun. 93, pp. 25-34.
USPTO Office Action, for U.S. Appl. No. 11/967,971, mailed Dec. 15, 2009, all pages.
USPTO Office Action for U.S. Appl. No. 11/765,909, mailed Mar. 18, 2011, all pages.
USPTO Office Action for U.S. Appl. No. 11/765,909, mailed Sep. 3, 2010, all pages.
USPTO Office Action for U.S. Appl. No. 12/178,287, mailed Apr. 18, 2011, all pages.
Europrean Patent Office, "Formalities Letter" dated Mar. 18, 2011 for EPC Application No. 06 300 059.0, 5 pages.
3GPP TS 45.003 v6.8.0 (Sep. 2005) 3rd Generation Partnership Project; Technical Specification Group GSM/EDGE, Radio Access Network; Channel coding (Release 6) 202 pages.
The State Intellectual Property Office of the People's Republic of China, Chinese Patent Application No. 20088021022.0, Document Serial No. 2011090900512470, Sep. 15, 2011, 10 pages.
Japanese Patent Office, "Office Action" (in Japanese) Japanese Patent Application No. 2010-512565, Nov. 22, 2011, 3 pages.
United States Patent and Trademark Office, "Final Office Action Summary", U.S. Appl. No. 12/178,287, Nov. 25, 2011, 42 pages.

* cited by examiner

METHOD, SIGNAL AND APPARATUS FOR MANAGING THE TRANSMISSION AND RECEIPT OF BROADCAST CHANNEL INFORMATION

FIELD OF THE INVENTION

The present invention relates generally to the management of the transmission and receipt of channel information and, more particularly, to the management of the transmission and receipt of channel information having variant and invariant information pertaining to a broadcast control channel in a wireless communication system.

BACKGROUND OF THE INVENTION

A broadcast control channel is typically a downlink channel received from the network infrastructure that contains specific parameters needed by a mobile subscriber in order for the mobile subscriber to identify the network and gain access to it. Often times, the broadcast control channel assists the mobile in translating between a logical and a physical channel, where the broadcast control channel will sometimes include frequency and timing information, that assist in accessing the network infrastructure's other channels.

Because of the importance of the broadcast control channel information in establishing a wireless communication link between the mobile subscriber and the network infrastructure, it is beneficial to organize and arrange the control channel information so as to enhance the reliability of the communication of the broadcast channel information. In at least some instances, the data will be encoded so as to include error detection and error correction information, as well as transmit information redundancies.

In at least some instances, the broadcast control channel information will be organized and arranged to be communicated during transmission intervals, where some of the broadcast control channel information may be communicated multiple times during which at least some of the information will remain the same or static. Each separate transmission within a transmission interval is sometimes embedded within a specific subinterval of the transmission interval referred to as a frame, where all or some of the frames associated with a particular broadcast communication channel, herein referred to as an active frame, may include broadcast control channel information. In some instances, some of the broadcast control channel information may vary between frames.

For example, information such as channel bandwidth, base station, and reference power levels, which may be periodically transmitted via a broadcast control channel may be defined as remaining static and/or invariant for the duration of a transmission interval. Other information such as system frame number, which corresponds to a system time reference may be allowed to vary between frames, even within a transmission interval.

In at least some proposals, the static information may be encoded using various transmission configurations, which define the conditions under which and the nature of a combination of encoding, modulating, interleaving and scrambling is performed, which in at least some instances can serve to further assist in the reliable receipt of the same. Multiple static retransmissions of the encoded data using the same or related transmission configurations can be used to allow for the combining of the received information by the mobile station across multiple transmissions or active frames within a particular transmission interval. However, the incorporation and/or encoding of some information that varies between frames can make the combining of multiple transmissions across multiple active frames of a transmission interval more difficult, as it is not always clear to the receiver how the varying data might affect the format after encoding between active frames during which the broadcast channel information is being transmitted. As a result, information that varies between frames is sometimes excluded from some encodings, which are used to enhance the reliability of the information being communicated.

The applicants have recognized that it is possible to sometimes identify invariant subportions of generally variant information, and include the invariant subportions in the other non-varying data that is being encoded in conjunction with a corresponding transmitter configuration. Furthermore, the size of the variant information can sometimes be minimized by controlling the nature of the variant information relative to a transmission interval boundary, and that the variant information can sometimes be communicated without including the variant information in the data being encoded for transmission. Still further, it is possible to accommodate the combining of some information that is allowed to vary between transmissions, which in turn enables the more reliable receipt of the information.

SUMMARY OF THE INVENTION

The present invention provides a method for transmitting broadcast channel information as part of a broadcast channel signal in a wireless communication system, where the broadcast channel signal has one or more transmission intervals, each transmission interval including a plurality of transmissions. One or more of the transmissions are active frames in which the broadcast channel information to be transmitted as part of each broadcast channel signal includes an invariant portion that remains static for each of the active frames within a particular transmission interval, and a variant portion that predictably changes with each successive active frame. The method includes subdividing the variant portion into an invariant subportion and a variant subportion, where the variant subportion includes at least one bit which changes value within the particular transmission interval. The invariant portion and invariant subportion from the broadcast channel information for each active frame are then identified, thereby forming invariant broadcast channel information for each active frame within a transmission interval that does not vary. The invariant broadcast channel information for each active frame within a transmission interval is then encoded with a transmission specific configuration, wherein each active frame is encoded with a distinct transmission specific configuration based upon the position of the active frame relative to the beginning boundary of the transmission interval. The encoded invariant broadcast channel information for each active frame of each transmission interval is then transmitted in sequence thereby forming the broadcast channel signal.

In at least one embodiment, upon receipt of the broadcast channel signal associated with a particular frame, the broadcast channel information is attempted to be decoded assuming at least one of the transmission specific configurations. If the broadcast channel signal associated with a particular active frame can not be decoded, then receiving one or more further successively transmitted active frames, and attempting to decode and combine multiple active frames including the particular active frame and the one or more further successively transmitted active frames assuming a transmission specific configuration for each of the active frames, which is consistent with the relative transmission sequence of each of the active frames.

The present invention further provides a broadcast channel signal. The broadcast channel signal includes one or more transmission intervals, each transmission interval including multiple transmissions. One or more of the transmissions are active frames in which broadcast channel information to be transmitted as part of each broadcast channel signal includes an invariant portion that remains static for each of the active frames within a particular transmission interval, and a variant portion that predictably changes with each successive active frame. The variant portion includes an invariant subportion and a variant subportion, where the variant subportion includes at least one bit which changes value within the particular transmission interval. The invariant subportion is then identified with the invariant portion for forming invariant broadcast channel information for each active frame within a transmission interval that does not vary. The variant subportion is used to determine a transmission specific configuration to be respectively applied to the invariant broadcast channel information of a particular active frame, based upon the value of the variant subportion, which coincides with the position of the active frame relative the beginning boundary of the transmission interval.

The present invention still further provides a wireless communication device. The wireless communication device includes a receiver for receiving a wireless communication signal in the form of one or more transmission intervals, where each transmission interval includes a plurality of transmissions, where one or more of the transmissions are active frames. The wireless communication device further includes a decoder for converting the received signal into an invariant portion of data intended to be transmitted prior to an encoding for transmission. The decoder includes a controller, where the controller is adapted to attempt to decode each active frame as it is received, using one of a plurality of decoding sequences, respectively corresponding to a transmission specific configuration associated with the transmission position relative to a beginning boundary of the transmission interval. The controller is further adapted to use a determined one of the plurality of decoding sequences, which allows for the successful decoding of the received wireless signal associated with a particular active frame to reintroduce a variant portion to the invariant portion of the data intended to be transmitted.

These and other objects, features, and advantages of this invention are evident from the following description of one or more preferred embodiments of this invention, with reference to the accompanying drawings.

DETAILED DESCRIPTION OF THE PREFERRED EMBODIMENT(S)

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Figure 1:
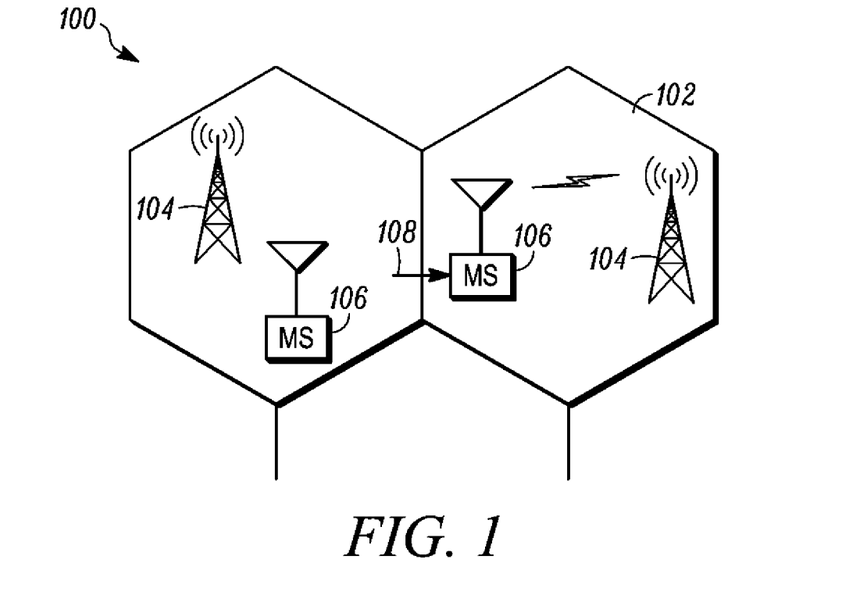
FIG. 1 is an exemplary topographical view of a geographical region representing at least a portion of the coverage area for a wireless communication system.

FIG. 1 illustrates an exemplary topographical view of at least a portion of a wireless communication system. The topographical view 100 includes a plurality of cells 102 pictorially represented as adjacent hexagons. The hexagons are only rough approximations of the footprint or area of coverage associated with each of a plurality of cellular regions, where in reality the area of transmission is not so uniformly defined. Each cell is typically served by one or more base transceiver stations (BTS) 104, referred to as a serving station, which communicates with mobile subscriber (MS) 106, such as a mobile wireless communication device, located and/or traveling 108 within the corresponding cell 102.

As a mobile subscriber 106 powers on or enters a new cell, a mobile subscriber will need to acquire the signaling information associated with the new cell. In many cases, this will involve monitoring one or more broadcast control channels, so as to allow the mobile station to obtain synchronization, timing and/or other related information consistent with establishing communication capabilities with the new cell. Because control channel reception is often a precursor for establishing other forms of communication with a particular cellular area, a more robust and/or effective manner in establishing a communication connection and receiving the information being conveyed by the broadcast control channel is desirable. The broadcast channel signal 200 is arranged in one or more transmission intervals 202, which each includes a plurality of transmissions or frames 204, where one or more of the transmissions are active frames in which broadcast channel information is transmitted. In the embodiment illustrated in FIG. 2, a transmission interval 202 coincides with a row of N frames, where N is an integer value.

Figure 2:
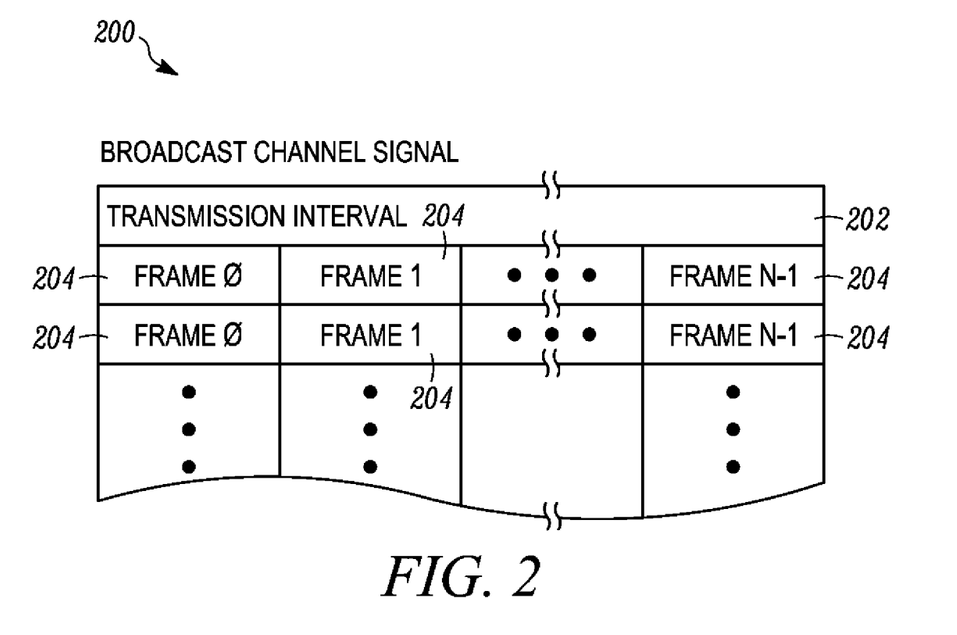
FIG. 2 is a block diagram of a broadcast channel signal.

In some cases, the broadcast channel signal will be encoded as part of each frame in a transmission interval. In other instances, it is possible that broadcast channel information will be transmitted on fewer than all of the corresponding frames. As noted above, frames in which broadcast channel information is transmitted as part of the transmission frame are identified in the present application as active frames. By transmitting on fewer than all of the frames associated with a particular transmission interval, the frames which do not support transmission of the broadcast channel signal, can be made available to other forms and/or types of data transmission.

In some instances it may be desirable to combine multiple active frames to more quickly and/or better receive the information being conveyed via the broadcast channel signal. Hence, the repeated transmission of at least some broadcast channel information across multiple active frames within a particular transmission interval. However, not all information can be readily repeated, where for example, in at least one discussed proposal, the broadcast information includes a system frame number that varies with each frame transmission.

Generally, broadcast channel information often includes both an invariant portion and a variant portion. However, even some subportions of the variant portion can be invariant. Furthermore, by more specifically controlling the relationship between the value of the variant portion, such as the system frame number, with respect to the beginning boundary value of the transmission interval and more specifically controlling the number of transmissions or frames in a transmission interval, the number of variant information bits in the variant subportion of the variant portion can be better managed. For example numbering the system frames, so that the frame number of the first frame after the beginning boundary of the transmission interval has a modulus n value that is equal to zero, where n is the number of transmissions (i.e. frames) in the transmission interval, can minimize the number of bits across which the system frame number might have a different bit value in any two transmissions in a particular transmission interval, where the system frame number predictably changes, and in this instance increments by one in each adjacent subsequent frame. However, one skilled in the art will readily recognize the value of the present invention regardless as to whether the value of the system frame number is defined to increment for adjacent subsequently transmitted frames, as noted above, where alternatively a properly defined predetermined predictable sequence can also benefit from the teachings of the present invention, if the system frame values from which the frames in a particular transmission interval are assigned and are selected from a list of values where only a predefined set of bits are allowed to change within the particular transmission interval.

Figure 3:
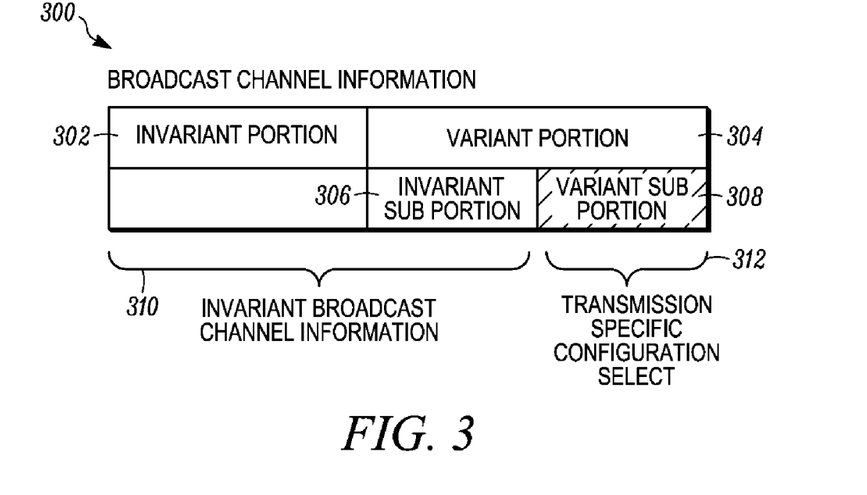
FIG. 3 is a block diagram of broadcast channel information, which forms the basis of the information encoded and used to form an active frame for transmission.

FIG. 3 illustrates broadcast channel information 300, in accordance with at least one aspect of the present invention, where generally, the broadcast channel information 300 will include an invariant portion 302 and a variant portion 304, where the variant portion 304 to the extent that all of the bits do not change or do not need to change within a transmission interval 202 is further subdivided into an invariant subportion 306 and a variant subportion 308. Together the invariant portion 302 and the invariant subportion 306 are identified, thereby forming invariant broadcast channel information 310, which in turn are encoded without including the variant subportion 308. The variant subportion 308 alternatively is used to select 312 a transmission specific configuration, that will apply a unique combination of encoding, modulating, interleaving and scrambling, based upon the value of at least the bits in the variant portion that change between at least two active frames in a transmission interval. In the illustrated embodiment, the variant subportion and/or the select value coincides with the number of the frame within the transmission interval beginning with zero and counting incrementally for each subsequent adjacent frame.

In the illustrated embodiment, the variant subportion is linked to a particular transmission specific configuration, such that the particular decoding sequence that allows for the successful decomposition of the data encoded in accordance with the transmission specific configuration will identify the value of the variant subportion, even though the specific value for the variant subportion was not included in the invariant broadcast channel information that was encoded. In this way, the variant subportion can be reintroduced without requiring that the variant subportion be included in the data used to form the signal being transmitted, separate from the data used to select the manner of the transmission specific configuration. In some instances, it is possible that the invariant broadcast channel information include information in addition to the invariant portion and invariant subportion, where the additional information might even correspond to the number of bits in the variant subportion, so long as the additional information included as part of the invariant channel information remains or is kept invariant for the duration of the transmission interval.

With regards to decoding the invariant broadcast channel information 310, the wireless communication device can make one or more assumptions regarding the nature of the transmission specific configuration used to modify the data for transmission, and then attempt to decode the encoded data. In some instances, the wireless communication device can cycle through each possible assumption. Nevertheless, in some circumstances, it may not be possible to decode the broadcast channel information 300, based upon the receipt of a single active frame. In these instances, upon receipt of a subsequent active frame, the earlier received active frame and the latter received active frame can be used to attempt to combine the two received active frames. Similar to the attempt to decode a single active frame, an assumption can be made relative to the particular transmission specific configuration used to modify the data for transmission for one of the two active frames, and the other particular transmission specific configuration for the other one of the two frames, which matches the assumption for the first active frame can be determined from an understanding of the relationship of the two active frames prior to transmission. Similarly the assumptions used for the first active frame can be similarly cycled through, and the matching transmission specific configuration for the other one of the two frames determined, and a corresponding attempt to decode made.

The process can be further repeated as necessary to include still further additional active frames, in the attempt to combine, and/or in the event that any of the earlier received active frames are determined to be preferably excluded from further attempts to combine, until a successful decomposition is made. At least one reason to exclude an earlier received active frame may be based upon an understanding that the invariant broadcast channel information may only be invariant across the transmission of the active frames of a particular transmission interval, such that one might exclude an earlier received active frame on the assumption that it was potentially part of a different earlier transmission interval across which an invariance of the broadcast channel information between different active frames can not be confirmed. It is also possible however, to readily extend the method of combining and decoding based on assumptions concerning the state of the invariant and variant broadcast information to include the case where the receiver makes a further assumption that the portion of the broadcast information that is invariant within a transmission interval also does not change from one transmission interval to the next.

Figure 4:
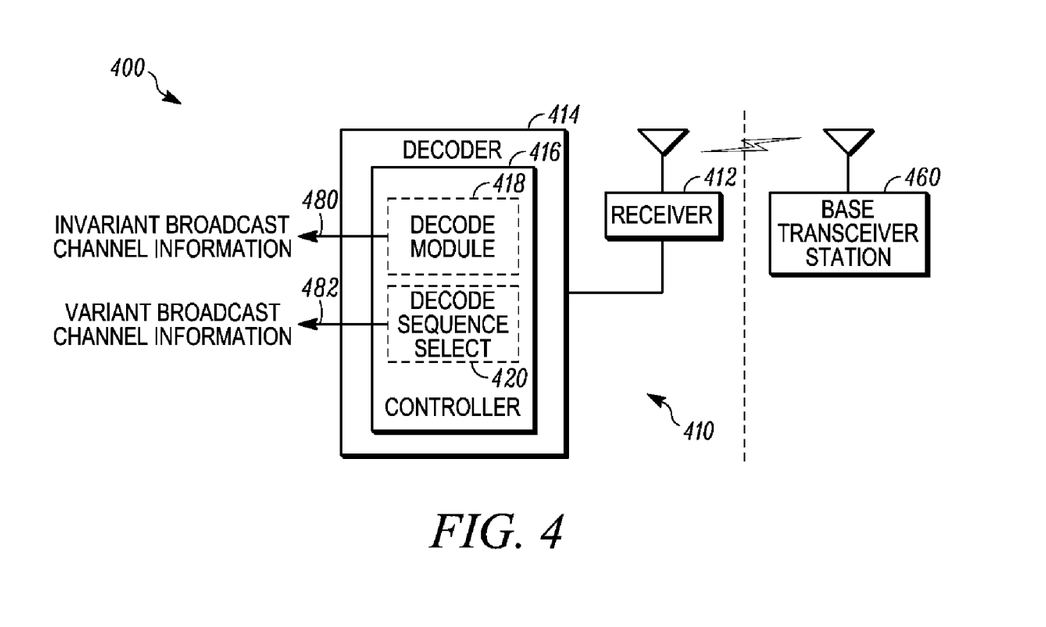
FIG. 4 is a block diagram of a wireless communication device, such as a mobile subscriber, and the portion of the cellular network infrastructure with which the communication device more directly communicates in connection with the receipt of a broadcast channel signal.

FIG. 4 illustrates a block diagram 400 of a wireless communication device 410, such as a mobile subscriber, and the portion of the cellular network infrastructure 460 with which the wireless communication device 410 more directly communicates in connection with the receipt of a broadcast channel signal 200. The wireless communication device 410 includes a receiver 412 for receiving a wireless communication signal. The wireless communication device 410 further includes a decoder 414 for converting the received wireless communication signal into an invariant portion of data 480 (i.e. invariant broadcast channel information), which was intended to be transmitted in connection with the encoding for transmission.

The decoder 414 further includes a controller 416 including a decode module 418, which is adapted to attempt to decode each active frame of the received wireless communication signal, as it is received using one of a plurality of decoding sequences, respectively corresponding to a transmission specific configuration. The controller additionally includes a decode sequence select 420, which is adapted to identify the particular decoding sequence that was successfully used to decode a particular active frame. For the present purpose, a decode sequence means a sequence of receiver processing operations designed in complementary fashion to the assumed transmitter configuration, i.e. a sequence of operations (in the order appropriate to the transmitter configuration) of de-encoding, de-modulating, de-interleaving and de-scrambling. The identified decoding sequence is then matched with a corresponding transmission position relative to a beginning boundary of a transmission interval for use in identifying a variant portion of data 482 (i.e. variant broadcast channel information), which can then be reintroduced back with the invariant portion of the data 480, in a manner which is the same or similar to the method described in conjunction with FIG. 3. Similarly, the decoder 414 of the wireless communication device 410 can be used to attempt to decode a combination of multiple active frames in the event that the decoder 414 is unable to decode a single received active frame.

Figure 5:
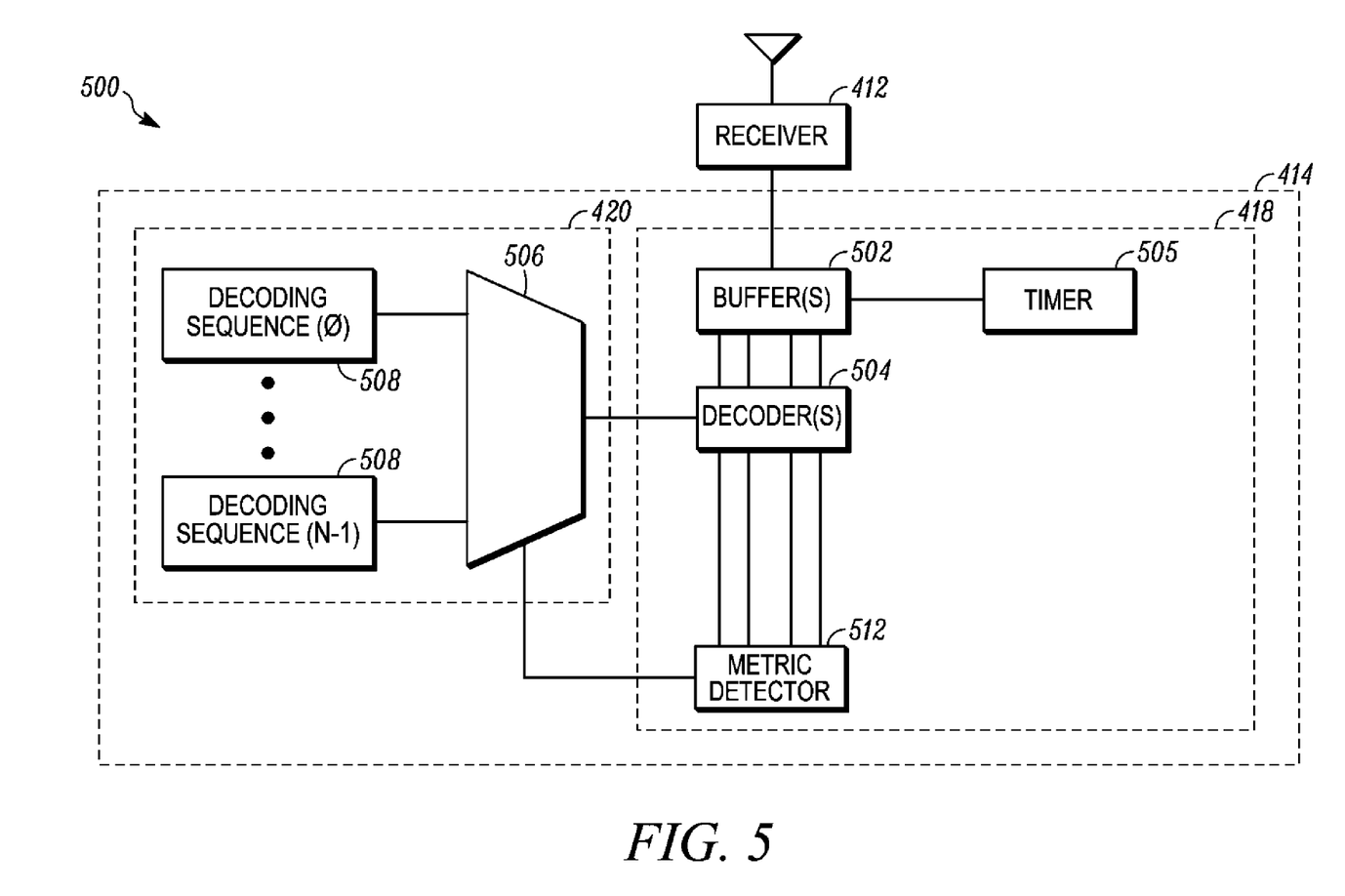
FIG. 5 is a more detailed block diagram of a mobile subscriber for use in receiving a wireless communication signal, and decoding the same, in accordance with at least one embodiment of the present invention.

FIG. 5 illustrates a more detailed block diagram 500 of a mobile subscriber for use in receiving a wireless communication signal, and decoding the same, in accordance with at least one embodiment of the present invention. Similar to the wireless communication device 400 illustrated in FIG. 4, the mobile subscriber includes a receiver 412 for receiving a wireless communication signal, which is coupled to decoder 414. The decoder includes a decode module 418 and a decode sequence select module 420. The decode module 418 includes one or more buffers 502 for storing active frames that have been previously received. A timer 505 provides a relative temporal relationship of the active frames received, such that a more accurate association can be made relative to the decoding of other received in view of an assumption relative to a first received active frame. This can account for instances in which intermediate active frames between two received active frames may not have been received and/or transmitted for one or more reasons.

The buffers 502 are coupled to one or more decoders 504, which are adapted to selectively separately apply one of one or more decoding sequences to each of the wireless communication signals that have been received and are stored in the one or more buffers 502. The separate selective application of one or more decoding sequences can be accomplished via a demultiplexor 506 coupled to definitions for one or more decoding sequences 508.

Upon attempting to decode the active frames that have been previously received, the attempted decodings are then applied to a metric detector 512, which identifies the threshold at which a match associated with a successful decoding is confirmed. This may include e.g. checking a cyclic redundancy check code. A successful match via the threshold detector 512 can be communicated to the demultiplexor 506, in order that any variant information associated with the received wireless signal contained in each of the buffers 502 can be associated with the corresponding active frame that was received.

Figure 6:
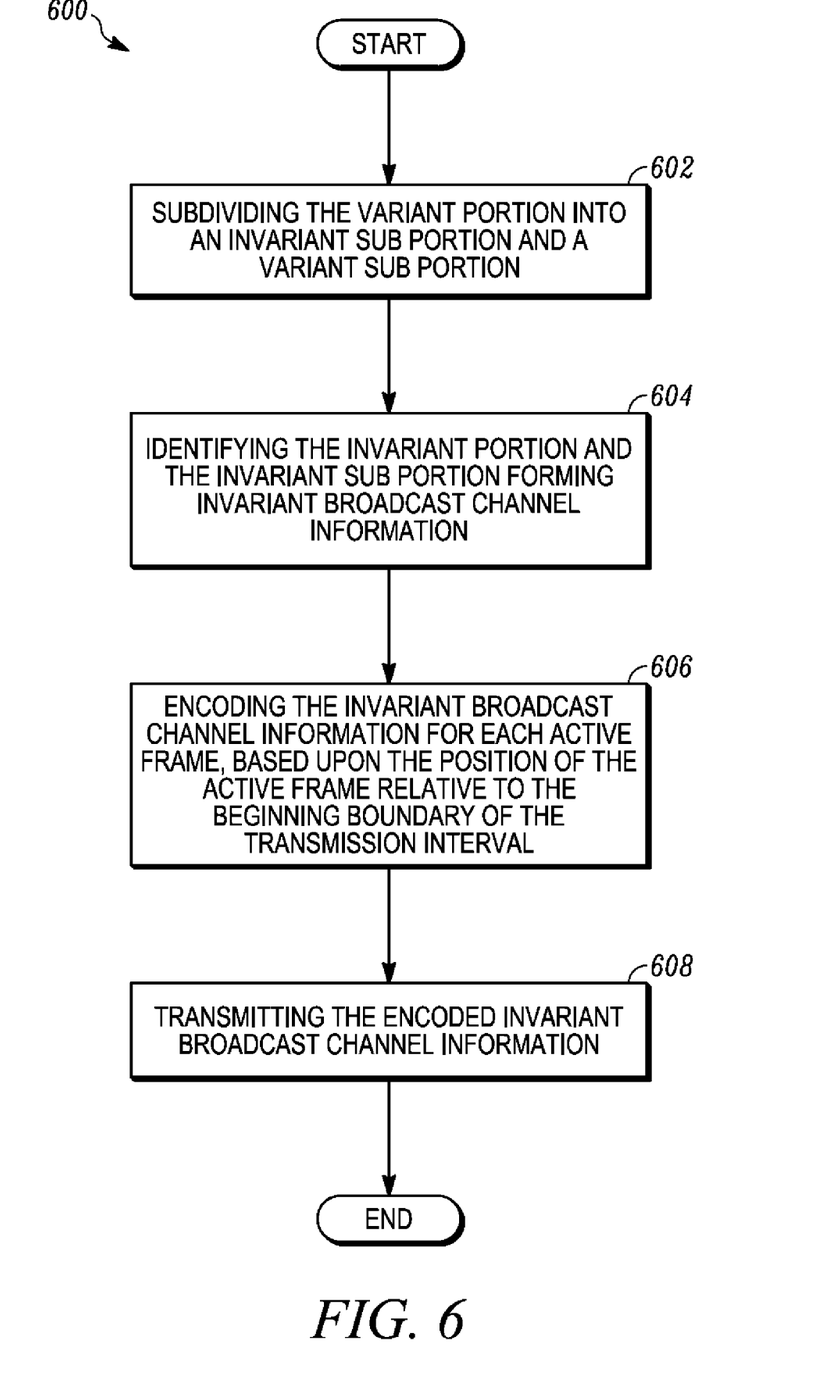
FIG. 6 is a flow diagram of a method for broadcasting channel information as part of a broadcast signal in a wireless communication network.

FIG. 6 illustrates a flow diagram 600 of a method for broadcasting channel information as part of a broadcast signal in a wireless communication network. The method includes subdividing 602 the variant unit into an invariant subportion and a variant subportion. The invariant portion and the invariant subportion is identified 604 for forming invariant broadcast channel information. The invariant broadcast channel information for each active frame is then encoded 606, based upon the position of the active frame relative to the beginning boundary of the transmission interval. The encoded invariant broadcast channel information is then transmitted 608.

Figure 7:
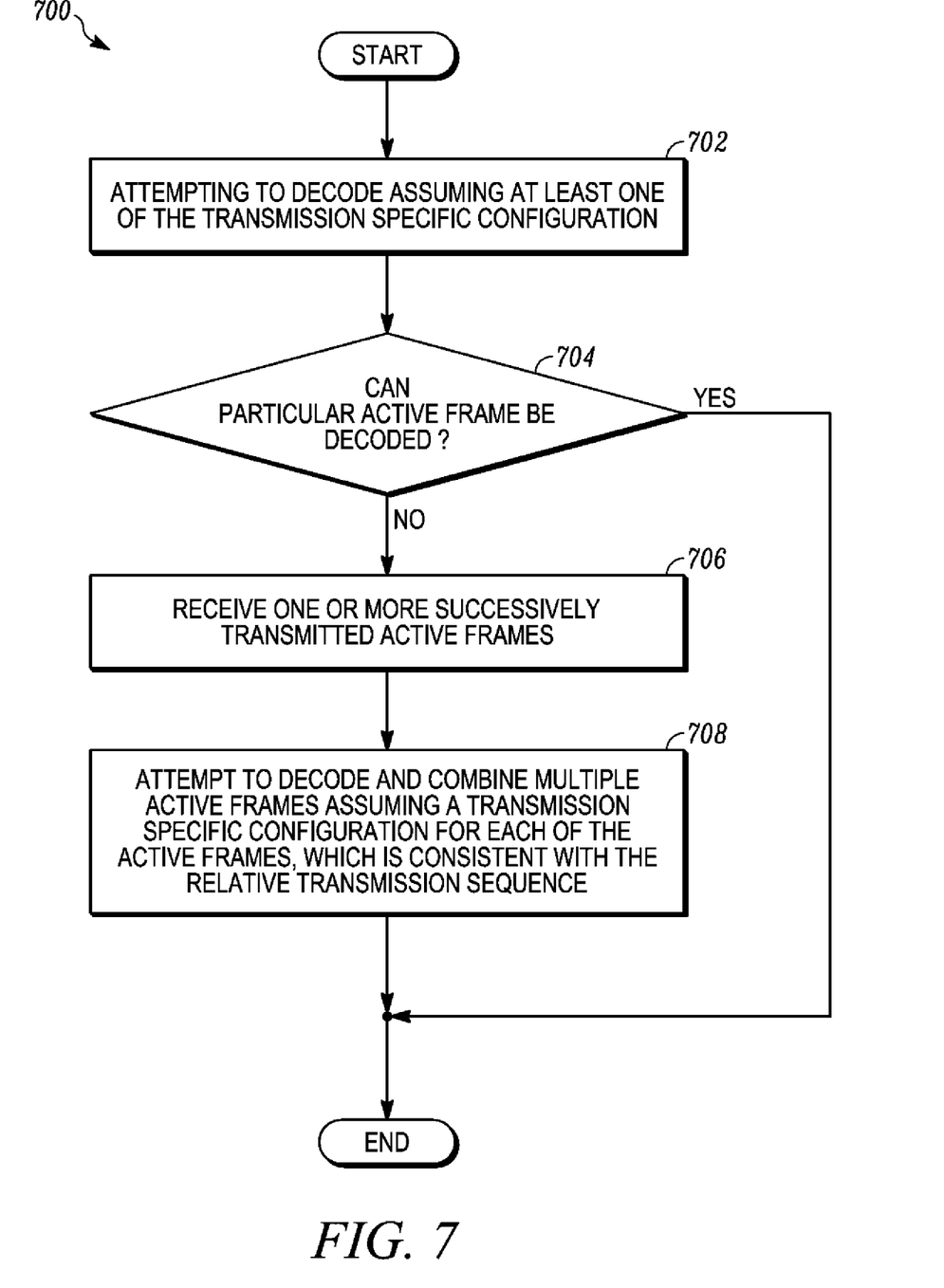
FIG. 7 is a flow diagram of a method of receiving and attempting to decode one or more successively transmitted frames in a wireless communication device for a broadcast of interest in a cellular communication network.

FIG. 7 illustrates a flow diagram 700 of a method of receiving and attempting to decode one or more successively transmitted frames in a wireless communication device for a broadcast of interest in a cellular communication network. The method includes attempting to decode 702 the broadcast channel information from the encoded invariant broadcast channel information that was received associated with a particular frame. A determination 704 is then made as to whether the particular active frame can be decoded. If yes, no further processing is necessary in conjunction with decoding the particular frame is necessary. However the decoded particular frame could be used as part of attempts to decode other related active frames that have been received. If no, one or more successively transmitted active frames are received 706. An attempt is then made to decode and combine the multiple active frames 708, assuming a transmission specific configuration for each of the active frames, which is consistent with the relative transmission sequence of each of the active frames.

While the present application focuses on an encoding of invariant broadcast channel information of each of the active frames based upon the relative position of the active frame with respect to a transmission interval boundary, additional encodings are possible without departing from the teachings of the present invention. For example, it may be desirable to apply cell specific configuration, which can includes a cell specific channel interleaving and/or a cell specific channel scrambling, in order to assist in distinguishing between different transmissions from different cellular base transceiver stations, so long as the appropriate decoding is accounted for at the receiver.

Furthermore while the present application generally refers to a mobile station, or a mobile wireless communication device, one skilled in the art will recognize the many different forms that are encompassed by such a generalized description including but not limited to cellular radio telephone, pagers, personal digital assistants, as well as other devices which support the wireless communication through their interaction with a cellular network infrastructure.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method for transmitting broadcast channel information as part of a broadcast channel signal in a wireless communication system, the broadcast channel signal having one or more transmission intervals, each transmission interval including a plurality of transmissions, where one or more of the transmissions are active frames in which the broadcast channel information to be transmitted as part of each broadcast channel signal includes an invariant portion that remains static for each of the active frames within a particular transmission interval, and a variant portion that predictably changes with each successive active frame, the method comprising:

subdividing the variant portion into an invariant subportion and a variant subportion, where the variant subportion includes at least one bit which changes value within the particular transmission interval;

identifying the invariant portion and invariant subportion from the broadcast channel information for each active frame, thereby forming invariant broadcast channel information for each active frame within a transmission interval that does not vary;

encoding the invariant broadcast channel information for each active frame within a transmission interval with a transmission specific configuration, wherein each active frame is encoded with a distinct transmission specific configuration based upon the position of the active frame relative to the beginning boundary of the transmission interval; and transmitting the encoded invariant broadcast channel information for each active frame of each transmission interval in sequence thereby forming the broadcast channel signal.

2. A method in accordance with claim 1, wherein the transmission specific configuration provides a transmission specific channel interleaving.

3. A method in accordance with claim 1, wherein the transmission specific configuration provides a transmission specific channel scrambling.

4. A method in accordance with claim 1, wherein the broadcast channel signal is broadcast from one of one or more cellular base transceiver stations, and wherein the invariant broadcast channel information from which the broadcast channel signal is formed, in addition to having active frames with a transmission specific configuration, is also encoded with a cell specific configuration, based upon the particular cellular base transceiver station that is transmitting the signal.

5. A method in accordance with claim 4, wherein the cell specific configuration provides a cell specific channel interleaving.

6. A method in accordance with claim 4, wherein the cell specific configuration provides a cell specific channel scrambling.

7. A method in accordance with claim 1, wherein upon receipt of the broadcast channel signal, the variant subportion is determined, based upon the transmission specific configuration that was identified as having been used to encode the particular active frame, when the broadcast channel signal is successfully decoded.

8. A method in accordance with claim 1, wherein upon receipt of the broadcast channel signal associated with a particular frame, the broadcast channel information is attempted to be decoded assuming at least one of the transmission specific configurations.

9. A method in accordance with claim 8, wherein if the broadcast channel signal associated with a particular active frame can not be decoded, then receiving one or more further successively transmitted active frames, and attempting to decode and combine multiple active frames including the particular active frame and the one or more further successively transmitted active frames assuming a transmission specific configuration for each of the active frames, which is consistent with the relative transmission sequence of each of the active frames.

10. A method in accordance with claim 1, wherein a beginning boundary of the transmission interval is aligned to coincide with a first transmission in the transmission interval having a mod n value of the variant portion that is equal to zero, where n is the number of transmissions in the transmission interval, and where the number of transmissions in the transmission interval has a value of 2 raised to an integer power.

11. A method in accordance with claim 10, wherein the number of bits forming the variant subportion is equal to the integer power that the value of 2 was raised to for identifying the number of transmissions in the transmission interval.

12. A method in accordance with claim 1, wherein after identifying the invariant subportion from the broadcast channel information and prior to encoding the invariant broadcast channel information for each active within a transmission interval with a transmission specific configuration, the invariant broadcast channel information can be further encoded using one or more encoding techniques.

13. A wireless communication device comprising:
an encoder configured to convert data to be transmitted to a broadcast channel signal, said broadcast channel signal including:
one or more transmission intervals, each transmission interval including multiple transmissions where one or more of the transmissions are active frames in which broadcast channel information to be transmitted as part of each broadcast channel signal includes an invariant portion that remains static for each of the active frames within a particular transmission interval, and a variant portion that predictably changes with each successive active frame;
wherein the variant portion includes an invariant subportion and a variant subportion, where the variant subportion includes at least one bit which changes value within the particular transmission interval, said invariant subportion being identified with the invariant portion for thereby forming invariant broadcast channel information for each active frame within a transmission interval that does not vary, where the variant subportion is used to determine a transmission specific configuration to be respectively applied to the invariant broadcast channel information of a particular active frame, based upon the value of the variant subportion, which coincides with the position of the active frame relative the beginning boundary of the transmission interval; and
a transmitter for communicating the broadcast channel signal in the form of a wireless communication signal.

14. A wireless communication device in accordance with claim 13, wherein a beginning boundary of the transmission interval is aligned to coincide with a first transmission in the transmission interval having a mod n value of the variant portion that is equal to zero, where n is the number of transmissions in the transmission interval, and where the number of transmissions in the transmission interval has a value of 2 raised to an integer power.

15. A wireless communication device in accordance with claim 13, wherein the transmission specific configuration provides a transmission specific channel interleaving.

16. A wireless communication device in accordance with claim 13, wherein the transmission specific configuration provides a transmission specific channel scrambling.

17. A wireless communication device comprising:
a receiver for receiving a wireless communication signal in the form of one or more transmission intervals, where each transmission interval includes a plurality of transmissions, where one or more of the transmissions are active frames; and
a decoder for converting the received signal into an invariant portion of data intended to be transmitted prior to an encoding for transmission, said decoder including a controller, wherein the controller is configured to attempt to decode each active frame as it is received, using one of a plurality of decoding sequences, respectively corresponding to a transmission specific configuration associated with the transmission position relative to a beginning boundary of the transmission interval; and wherein a determined one of the plurality of decoding sequences, which allows for the successful decoding of the received wireless signal associated with a particular active frame is used to reintroduce a variant portion to the invariant portion of the data intended to be transmitted.

18. A wireless communication device in accordance with claim 17, wherein the controller is further configured to combine multiple active frames, when one or more of the received active frames can not be separately decoded, where prior to combining the multiple active frames, an assumed decoding sequence is applied to the received frames prior to combining, where the assumed decoding sequence applied to each of the active frames is consistent with the relative received relationship of the plurality of active frames within an assumed transmission interval.

19. A wireless communication device in accordance with claim 17, wherein the wireless communication signal is a broadcast channel, where broadcast channel information to be transmitted as part of each wireless communication signal includes a variant portion, which changes between multiple active frame transmissions within a particular transmission interval, and an invariant portion, which does not change between multiple active frame transmissions within the particular transmission interval.

20. A wireless communication device in accordance with claim 17, wherein the decoder includes a timer for detecting the time interval between receipt of each active frame.

* * * * *